United States Patent [19]

Lee

[11] Patent Number: 4,485,282

[45] Date of Patent: Nov. 27, 1984

[54] PLUG-IN TYPE OF SAFETY WALL SWITCH AND WALL OUTLET

[76] Inventor: Long-River Lee, 2nd Fl., No. 17, La. 90, Yu-Ming 6th Rd., Peitou, Taipei, Taiwan

[21] Appl. No.: 462,095

[22] Filed: Jan. 28, 1983

[51] Int. Cl.³ .......................................... H01H 13/70
[52] U.S. Cl. .................................. 200/51 R; 200/293; 174/53
[58] Field of Search ..................... 200/51 R, 293–297; 339/147 R; 174/53, 55; 361/392–394, 356, 357

[56] References Cited

U.S. PATENT DOCUMENTS

| | | | |
|---|---|---|---|
| 2,531,350 | 11/1950 | Chrastina | 200/297 X |
| 2,876,394 | 3/1959 | Gerrish | 174/53 |
| 2,908,743 | 10/1959 | Premoshis | 200/297 X |
| 3,038,141 | 6/1962 | Chiuchiolo | 200/297 X |
| 3,163,728 | 12/1964 | Martin | 200/51 R |
| 3,828,224 | 8/1974 | Hulshizer | 200/51 R |
| 4,103,125 | 7/1978 | Marrero | 200/51 R |

FOREIGN PATENT DOCUMENTS

1100133 10/1958 Fed. Rep. of Germany ...... 200/297

Primary Examiner—Stephen Marcus
Assistant Examiner—Ernest G. Cusick
Attorney, Agent, or Firm—Balogh, Osann, Kramer, Dvorak, Genova & Traub

[57] ABSTRACT

A wall switch and a wall outlet each comprises a plug-in unit to be inserted in a niche installed on a base which also includes a panel and a base plate bing fixed together. Between the panel and the base plate, a control frame and a movable latch are sandwiched, and each of them has a projected end extending out of the apertures in the panel so as to facilitate manual operation for removing the plug-in unit. In addition, a thumbtack pin may be furnished at the back of the base plate, penetrating through the base plate and the movable latch so as to prevent the plug-in unit from being removed directly.

14 Claims, 24 Drawing Figures

PLUG-IN TYPE OF SAFETY WALL SWITCH AND WALL OUTLET

BACKGROUND OF THE INVENTION

The safety and practicality are always two major characteristics to be researched for the wall switch and the wall outlet; however, the current and conventional wall switch and outlet still can not meet the requirements of said two characteristics. Taking repair safety for instance, a general switch or outlet can not usually be repaired or replaced before cutting off the main power supply; as a result, the power supply for other load will be interrupted. In that case, the power supply for the illuminating equipment will also be interrupted, and any repair or replacing work will be very difficult, if not impossible, to do during the night. In the old and conventional switch or outlet, once a switch or outlet has trouble, the whole base plate has to be replaced, and the other switch or outlet in normal condition in that base plate will also be wasted. After repeated repair, the base plate or the threads of the screws may be damaged to cause the whole base plate unable to be attached in position, or to cause to fall off.

In some new and current switches or outlets, any one switch or outlet on a common base plate or base frame may be replaced by removing the panel. Since the power wire is directly connected to the switch or the outlet, the power supply has to be cut off and the power wire has to be removed before working on the back of the said base plate with or without tools to dismount the switch or outlet safely. Therefore, it is still inconvenient to remove or to replace it, especially to the general family which knows little about electric engineering.

Although the aforesaid conventional wall switch and outlet may be able to prevent from electric shock because they are unable or difficult to be singly removed, said safety feature may also present another non-safety and inconvenience features during repair in case of having trouble. Therefore, they will naturally be challenged in the area of safety and practicality.

SUMMARY OF THE INVENTION

The object of the present invention is to provide a plug-in type of safety wall switch and wall outlet with the following features, functions under the principles of concurrently considering the safety and practicality:

1. The wall switch and the wall outlet devices include a plug-in unit respectively. After a simple wiring and working, a plug-in switch or an outlet unit may respectively be inserted into a only niche in a power outlet assembly, or may optionally be inserted into several niches in a power outlet assembly so as to have them fixed in the niches, and to have their contacts directly come into contact with the contacts installed at the bottom of said niches. In other words, all the plug-in units are interchangeable prior to practical wiring so as to provide the designers and the workmen with more flexibility and choice.
2. Upon the plug-in switch unit and outlet unit being inserted into the niches, their interchangeability will be lost so as to assure the correctness and safety after being removed for replacement (i.e. to prevent from the possibility of inserting into a wrong niche).
3. Under the normal contact condition, there are two retaining functions between the plug-in unit and the power outlet assembly for surely fastening function; the plug-in unit will not be sprung out just because of being touched by the user incidentally or being played by the infant.
4. In case of one plug-in being out of order, the unit may easily be sprung out by simple manipulation without using any tools so as to replace it with a new one, or to repair it, if necessary.
5. Either the plug-in switch unit or the plug-in outlet unit is provided with two fuse slots respectively for storing two fuse elements, of which one fuse element is used for providing protection function, while the other fuse is a spare one.
6. The wall switch and wall outlet are furnished with steal-proof design in order to prevent the plug-in units from being stolen or changed, or to provide an absolute safety assurance of non-electric shock. However, upon removing the screws on the panel of the power outlet assembly, a thumbtack pin that can indirectly prevent the plug-in unit from being sprung out will easily be removed to restore removable nature of the plug-in unit so as to conduct repair or replacement, if necessary.

DETAILED DESCRIPTION OF THE PREFERRED EMBODIMENT

Figure 1:
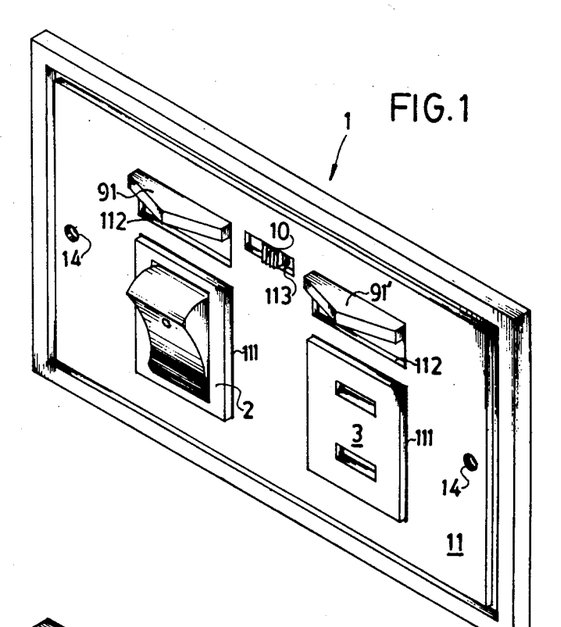
FIG. 1 is a perspective view of the wall switch and wall outlet as an embodiment of the present invention.
Figure 2:
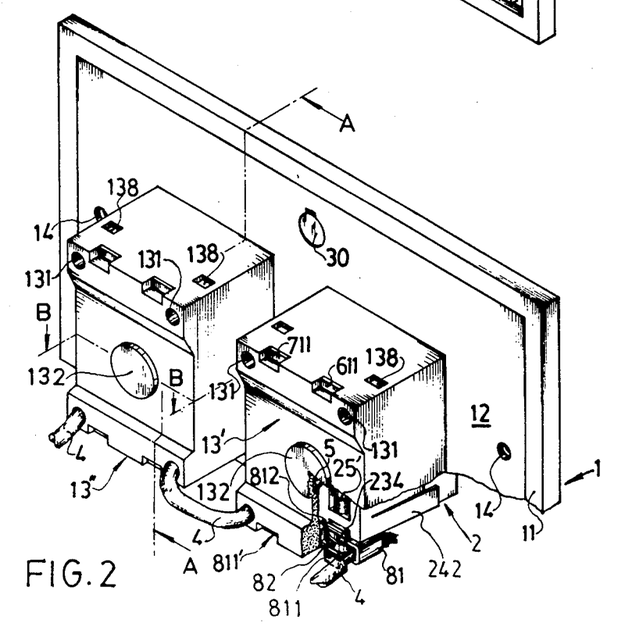
FIG. 2 is a perspective view, seen from the rear side, of the device shown in FIG. 1, in which one corner of the power outlet assembly is broken away to expose the plug-in switch unit therein.

The embodiment and the features of the present invention are described, by referring to the drawings, in detail as follows:

Referring to FIG. 1 and FIG. 2, there is shown an embodiment of the present invention, in which the power outlet assembly (1) is inserted with a plug-in switch unit (2) and a plug-in outlet unit (3). The power outlet assembly (1) includes a panel (11) and a base plate (12) being fixed together, and two niches (13') and (13") being installed behind the base plate (12), in which one is for the plug-in switch unit (2) and the other is for the plug-in outlet unit (3). On the panel (11), there are two rectangular apertures (111) for the plug-in units (2) and (3) to penetrate through, two apertures (112) for the push keys (91) and (91') of the control frames (sandwiched between the panel (11) and the base plate (12); shown in FIG. 14) to extend out, and another aperture (113) for the salient head of the movable latch (10) to extend out. The two screw holes (14) are used for fixing the power outlet assembly (1) to the wall box with two screws. The panel (11) and the base plate (12) may be fixed together by applying an adhesive between their edges or with other method so as to prevent the parts (such as said control frame and movable latch) between the panel (11) and the base plate (12) from falling down during removing the power outlet assembly (1) by loosening the screws.

Figure 3:
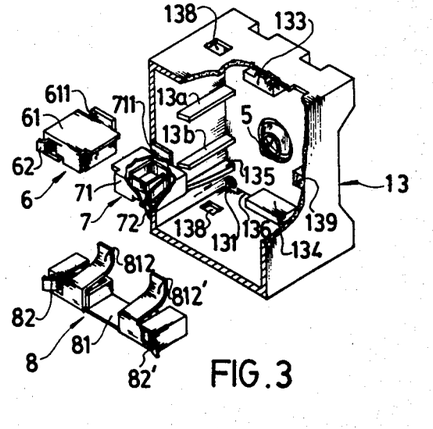
FIG. 3 is an exploded view of the common niche in the present invention, wherein the niche and one spring contact are partly broken away to expose interior construction details.

Before installing the plug-in unit (2) and (3) for the first time, the switch niche (13') and the outlet niche (13") may have an identical structure labeled as common niche (13) shown in FIG. 3. Referring to FIG. 2, there are shown four holes (131) at the four bottom corners of the niches (13') and (13"), being used as the inserting holes for the power wires (4) (partly shown). In the bottom center of said niche, a shallow hole (132) is provided for installing a conic spring (5). Referring to FIG. 3, there are shown two spring contacts (6) and (7) and another spring contact pair (8), the spring control pair being installed at the two bottom corners of the common niche (13). In fact, the spring contact pair (8) is a connection of two spring contacts which are identical with the spring contact (6) and (7). An insulating salient piece (133) is used to separate and to fix the spring contacts (6) and (7), while another salient piece (134) projected from the niche bottom is used for fixing the spring contact pair (8).

Referring to FIG. 3, four slanting studs (135) (only one being shown) at the bottom of the niche are used for fixing the spring contacts (6), (7) and (8). Further, the spring contacts (6), (7) and (8) may also obtain additional fixing force by means of their salient feet (611), (711) (shown in FIGS. 2 and 3), (811) and (811') (shown in FIG. 2) to penetrate thru the four seams (136) (only one is shown) at the niche bottom and then to bend into the four notches at the bottom of the niche (13).

The spring contacts (6), (7) and the spring contact pair (8) each has at least one outer leaf spring and one inner leaf spring. Each outer leaf spring can at least provide one contact point to contact with the corresponding spring contact on the plug-in unit (2) or (3). For example, in FIG. 3, the spring contact pair (8) includes a longer outer leaf spring (81) and two inner leaf spring (82) (82') at the both ends of said outer leaf spring (81). The spring contacts (6) and (7) comprise two outer leaf springs (61) (71) and two inner leaf springs (62) (72) respectively.

Each of the inner leaf springs (62), (72), (82) and (82') is a bent leaf spring with one end extending out of the opening of the outer leaf spring.

Referring to FIG. 3, there is shown the outer leaf spring (81) of the spring contact pair (8) having two contacts (812) and (812') bent downwards so as to contact with the corresponding contacts of the plug-in unit (2) or (3).

Referring to FIGS. 2 and 3 and taking the spring contact pair (8) for example, the power wire (4) is inserted into the hole (131), and is fastened between the inner leaf spring (82) and the outer leaf spring (81). By means of the elastic force of the extended end of the inner leaf spring (82), the bare portion of the wire out of the outer leaf spring (81) is fastened firmly so that the power wire (4) might be almost unable to be pulled out once being inserted. Further, beside the position where the extended end of each said inner leaf spring extends out, a window (138) is provided for pulling out the power wire (4), if necessary, by using a screwdriver to penetrate therethrough and to push aside and hold said inner leaf spring.

Figure 4:
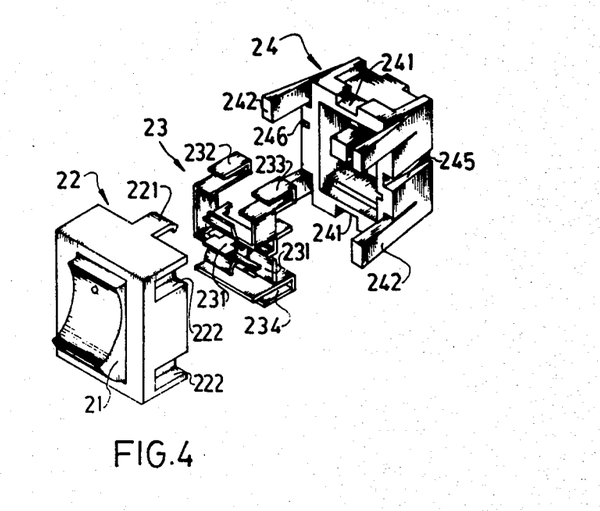
FIG. 4 is an exploded view of the plug-in switch unit shown in FIG. 1.

Referring to FIG. 4, there is shown the plug-in switch unit (2), which includes a top cover (22) for mounting the switch button (21) and a base (24) for installing the spring contact assembly (23). At the bottom of the top cover (22), there are two hooks (221), which are to be hooked together with the two grooves (241) respectively. On the two opposite outside of the top cover (22), there are four channels (222) which can be dovetailed with the corresponding four salient lugs (242) of the base. Each salient lug (242) extends from the bottom edge of the base (24) toward the top cover (22) at a given suitable angle so as to let it have the inward and outward elasticity. Upon the salient lugs (242) being pressed inwards, they will completely be tucked into the corresponding channels (222).

Figure 5:
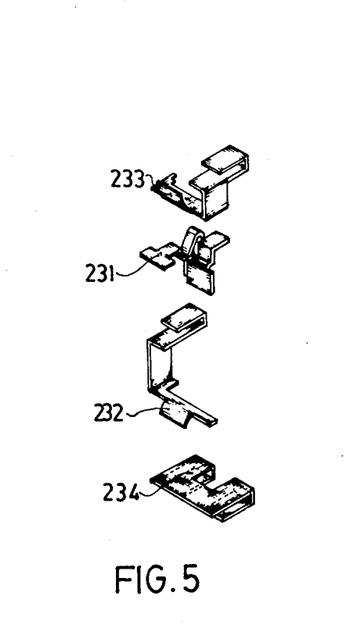
FIG. 5 is an exploded view of the spring contact assembly shown in FIG. 4.

Referring to FIGS. 4 and 5, there are shown the spring contact assembly (23) including one movable spring contact (231) and two fixed spring contacts (232), (233) which form a double-throw switch, and one fixed leaf spring (234) that leads the movable spring contact (231) to the outside bottom of the base (24).

Figure 6A:
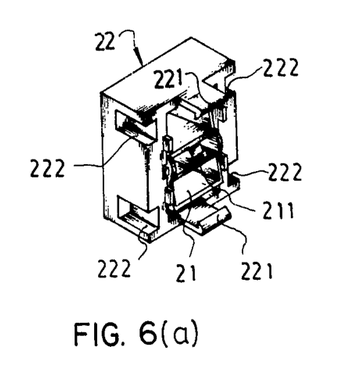
FIG. 6a is a perspective view, viewed from the rear side, of the top cover and the switch button of the plug-in switch unit shown in FIG. 4.

Referring to FIG. 6, the movable spring contact (231) may be actuated by means of its movable end being engaged with the notch (211) at the bottom of the switch button (21).

Figure 6B:
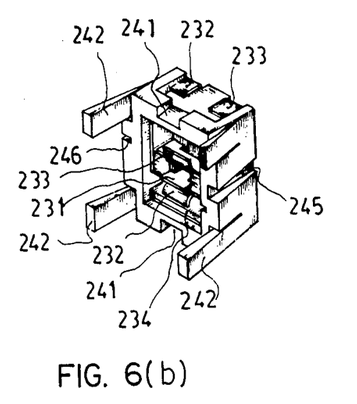
FIG. 6b is a perspective view of the spring contact assembly and the base shown in FIG. 4, in which one salient lug of the base is cut off.
Figure 7:
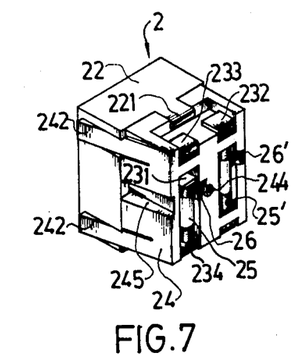
FIG. 7 is a rear perspective view of the plug-in switch unit shown in FIG. 1.
Figure 8:
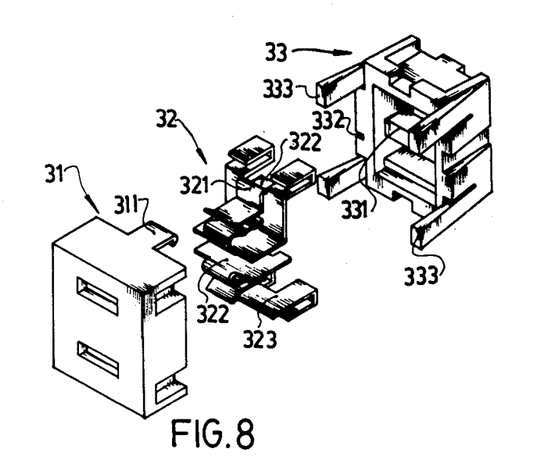
FIG. 8 is an exploded view of the plug-in outlet unit shown in FIG. 1.
Figure 9:
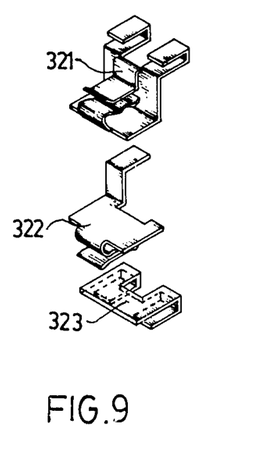
FIG. 9 is an exploded view of the socket contact assembly shown in FIG. 8.
Figure 10A:
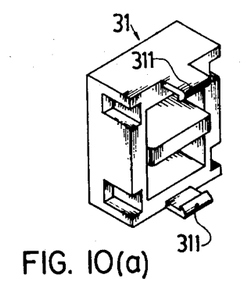
FIG. 10a is a perspective view, viewed from the rear side, of the top lid shown in FIG. 8.
Figure 10B:
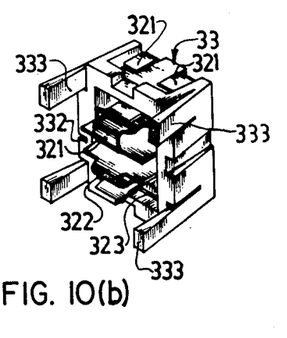
FIG. 10b is a perspective view of the socket contact assembly and the base shown in FIG. 8, in which one salient lug of the base is cut off.

The fixed spring contacts (232) and (233) each has a salient foot being bent between the bottom and the outer side of the base (24), as shown in FIG. 6(b). Referring to FIG. 7, there is shown the salient foot of the movable spring contact (231) penetrating thru the bottom of the base (24) and extending into one of the two fuse slots on the bottom of the base (24). Thru the fuse element (25) stored in this fuse slot, the salient foot of the movable spring contact can connects electrically with the salient foot of the fixed leaf spring (234), while a spare fuse element (25') is stored in the other fuse slot which has no metallic contact with any spring contacts. Two ribbons (26) and (26') each has an end being fixed in the two fuse slots for the purpose of removing the fuse elements (25), (25') easily. Between said two fuse slots, a conic hole (244) is provided at the base bottom for engaging with the top of the conic spring (5) shown in FIGS. 2 and 3 upon the plug-in switch unit (2) being inserted into the switch niche (13').

Referring to FIG. 4, there are shown a guide groove (245) on the outside of the base (24), and a small groove (246) on the opposite outside of said base. Referring back to FIG. 3, there are shown a guide rail (139) corresponding to the guide groove (245) and an upper and a lower salient pieces (13a), (13b) inside the common niche (13), wherein the upper salient piece (13a) is at the position corresponding to the small groove (246).

Upon installing the wall switch in the working site, cut off the lower salient piece (13b) with a pair of pointnosed pliers; then, insert the plug-in switch unit (2) into the niche along the guide rail (139) and the upper salient piece (13a). After being inserted, the two fixed spring contacts (232) and (233) of the plug-in switch unit (2) will directly contact with the spring contacts (6) and (7) in the niche (13') respectively; the movable spring contact (231) of said switch unit (2) will indirectly contact with the spring contact pair (8) in the niche (13') by means of the fuse (25) and the fixed leaf spring (234), as shown in FIG. 2.

In other words, the common niche (13) shown in FIG. 3 may be used as the switch niche (13') shown in FIG. 2 upon the lower salient piece (13b) being cut off.

Figure 11:
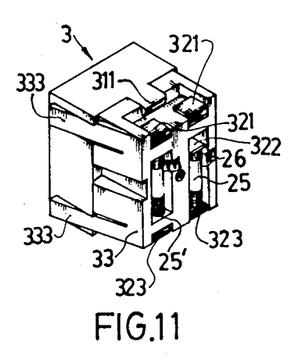
FIG. 11 is a perspective view, viewed from the rear side of the plug-in outlet unit shown in FIG. 1.

Referring to FIGS. 8 to 11, there is shown the plug-in outlet unit (3), which includes a top lid (31) and a base (33) to install the socket contact assembly (32). The top lid (31) has two hooks (311) which are identical to the hoods (221) of the top cover (22) in the plug-in switch unit (2). The base (33) is similar to the base (24) of the plug-in switch unit (2) except that a insulating piece (331) is installed therein to insulate the two socket contacts (321) and (322), and the outer left side groove (332) is corresponding to the lower salient piece (13b) in the common niche (13) shown in FIG. 3. The base (33) also has four symmetrical salient lugs (333). The socket contact (321) has two salient feet being bent between the bottom and the outside of the base (33), as shown in FIG. 10(b). And another socket contact (322) has a salient foot penetrating thru the bottom of the base (33), appearing at one end of a fuse slot on the base bottom so as to come into contact with the fuse element (25) stored in that fuse slot, as shown in FIG. 11. The two salient feet of the fixed leaf spring (323) are bent over the opposite position of the salient feet of the socket contact (321), and one of the salient feet is appearing at the other end of said fuse slot, having metallic contact with the fuse element (25).

Figure 12:
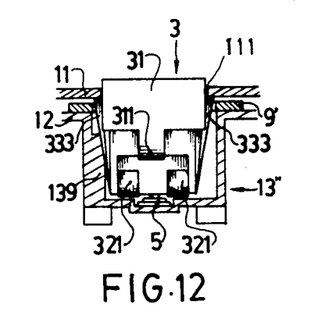
FIG. 12 is a partial sectional view taken along section line 12—12 of FIG. 2 looking in the direction of the arrows.
Figure 13:
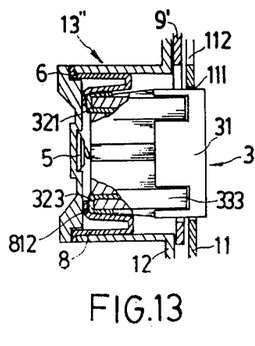
FIG. 13 is a partial sectional view taken along line 13—13 of FIG. 2 looking in the direction of the arrows.

Therefore, upon the upper salient piece (13a) in the common niche (13) shown in FIG. 3 being removed, the plug-in outlet unit (3) shown in FIG. 11 may be inserted into the niche as shown in FIG. 12 so as to have the salient feet of the socket contact (321) directly contacted with the spring contacts (6) and (7) in the niche (13''), and to have another socket contact (322) indirectly contacted with the spring contact pair (8) by means of the fuse element (25) and the fixed leaf spring (323), as shown in FIG. 13. In other words, once the upper salient piece (13a) inside the common niche (13) shown in FIG. 3 is removed, said niche may be used as the outlet niche (13'') shown in FIG. 2.

The first function of the fixed leaf spring (234) in the plug-in switch unit (2) and the fixed leaf spring (323) in the plug-in outlet unit (3) is, by means of the fuse (25), to connect one terminal of the power supply to the movable spring contact (231) and the socket contact (322) respectively. The second function of said fixed leaf spring (234) or (323) is to provide a extra contact by means of one of its two salient feet, together with the spring contact pair (8) inside the niche (13') or (13''), so as to transmit the power supply at one terminal incoming from a given spring contact in a niche to the rest switch niche or outlet niche. Referring back to FIG. 2, there is shown the power wire (4) connecting between the switch niche (13') and the outlet niche (13'').

The salient pieces (13a) and (13b) may be made into a rather thin piece (under 1 mm.) to serve the purposes, with one salient piece left, for being cut off easily and preventing the plug-in unit (2) or (3) from being inserted into a wrong niche; in other words, it will assure the correct insertion for safety sake. During the first time installing work, even the bottom of the salient piece (13a) or (13b) is not cut off clearly, it won't affect the insertion because of the plug-in (2) and (3) include respectively a base (24) and a base (33) tapering off slightly toward the bottom.

In a few words, the plug-in switch unit (2) and the plug-in outlet unit (3) are interchangeable during installing operation (i.e., the niche (13) is adaptable to either the plug-in unit (2) or (3)) so as to provide the electrical engineer or the electrician with a considerable flexibility. However, once the first time installing work is done, the said interchangeable feature will be ended so as to assure safety.

Figure 14:
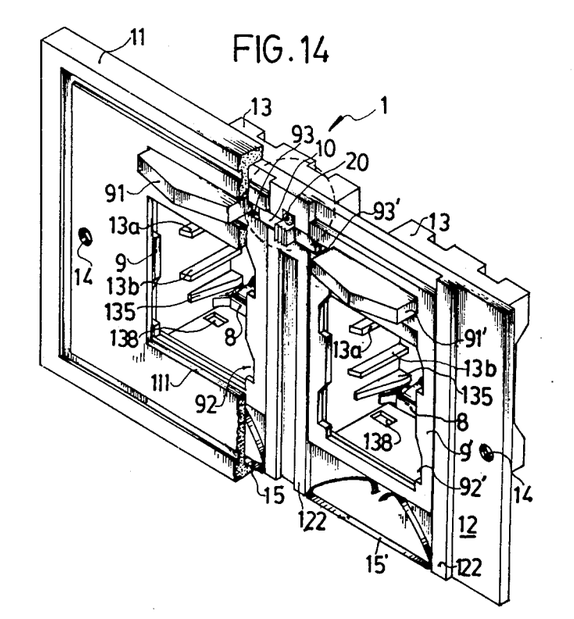
FIG. 14 is a perspective view of the power outlet assembly with the panel partly broken away to expose the control frames therein.

Referring to FIG. 14, there are shown two control frames (9) and (9') being sandwiched between the panel (11) and the base plate (12) of the power outlet assembly (1). Each of said frames (9) and (9') has, at one end, one push key (91) and (91') extended out of the aperture (112) on the panel (11) as shown in FIG. 1 so as to facilitate manual operation. Along the edges of the windows of the control frame (9) or (9'), four symmetrical slanting cuts (92) and (92') are furnished respectively, so that the width between two opposite slanting cuts (92) or (92') is wider than that of the aperture (111) on the panel (11).

Figure 15:
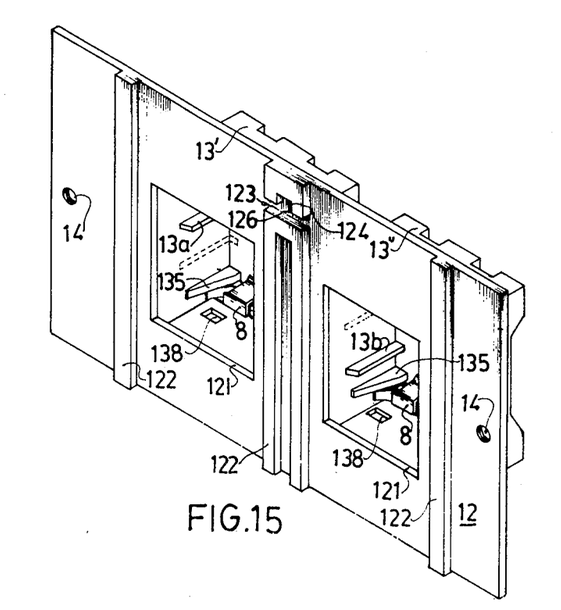
FIG. 15 is a perspective view of the power outlet assembly with the panel being removed.

Referring to FIG. 15, there are shown two embossed rails (122) at both sides of each opening (121) on the base plate (12) for positioning each of the control frames (9) and (9'). The two rails (122) between the two openings (121) is divided into two portions by a groove (123): the lower portion and the upper portion, which are all closed together at their top with the result that a slot (124) is formed. FIG. 15 also shows the marks (shown with dotted line) left by removing the salient piece (13a) or (13b) upon modifying a common niche (13) into a switch niche (13') or an outlet niche (13'').

Referring to FIG. 14, there is shown a movable latch (10) being furnished in the groove (123). The salient head of the movable latch (10) extends out of the aperture (113), as shown in FIG. 1, so that the movable latch (10) can be moved laterally. In the slot (124), a small rubber roller (20) having a diameter bigger than the depth of said slot is fitted to press against the movable latch (10) under still condition so as to have said latch always maintained in the center position without freely moving, no matter how the power outlet assembly (1) is installed (horizontally or vertically) in the wall box on the wall.

Figure 16A:
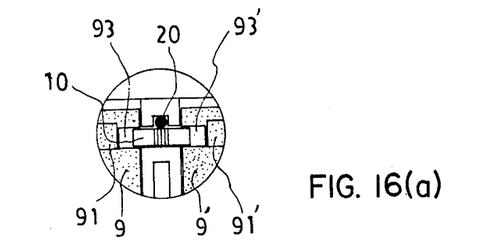
FIGS. 16a, 16b, and 16c show three schematic state diagrams for illustrating the relationship between the movable latch and the control frame shown in FIG. 14.

Referring to FIGS. 14 and 16(a), the two control frames (9) and (9') each has a slot (93) and (93'), which are adjacent to the both ends of the movable latch (10), so as to have the ends of the movable latch (10) entered into said slots (93) and (93') a little distance respectively under the aforesaid still condition. Under that condition, a pressure applied to any one of the push keys (91) and (91'), with the direction toward the bow springs (15) and (15'), will not cause the control frames (9) and (9') to move downwards along the rails (122).

Figure 16B:
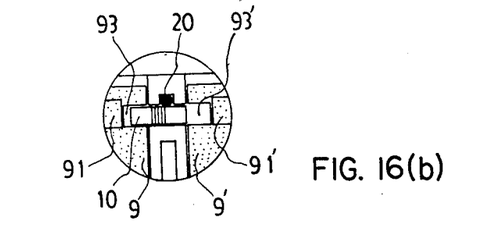
Figure 16C:
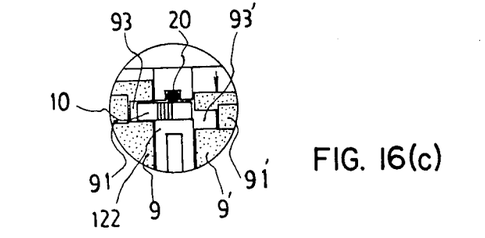

Referring to FIG. 16(b), there is shown a schematic diagram in which the movable latch (10) has been moved toward the slot (93). Under this condition, the control frame (9') can be moved downwards as shown in FIG. 16(c), and will be moved back to its original position with the force of the bow spring (15') upon the pressure being removed.

Figure 17:
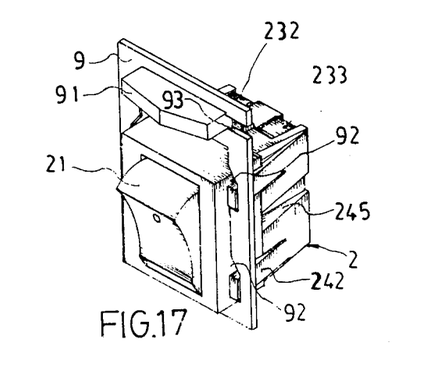
FIG. 17 is a schematic diagram for illustrating the static relationship between the plug-in switch unit and the control frame.

Since the width of the aperture (121) of the base plate (12) is slightly bigger than that of the aperture (111) of the panel (11) (referring to FIGS. 12 and 15), and assuming that the plug-in outlet unit 3 shown in FIG. 12 is a plug-in switch unit 2, and since the position of the four salient lugs (242) on the plug-in switch unit (2) is exactly opposite to the static position of the four slanting cuts (92) on the control frame (9) as shown in FIG. 17, during inserting the plug-in switch unit (2) into the switch niche (13') thru the panel aperture (111), the four salient lugs (242) will be pressed gradually by the edges of the aperture (111) until the top surface of said salient lugs (242) being lower than the bottom surface of the panel (11); then, the salient lugs (242) will be released by the aperture (111), and spring back to their previous position. In other words, upon the plug-in switch unit (2) completely being inserted into the niche (13'), the four salient lugs (242) will spring out immediately with their top surface being caught under the panel (11) so as to have the plug-in switch unit (2) fixed in the niche (13') without being sprung out by the conic spring (5) at the niche bottom.

Figure 18:
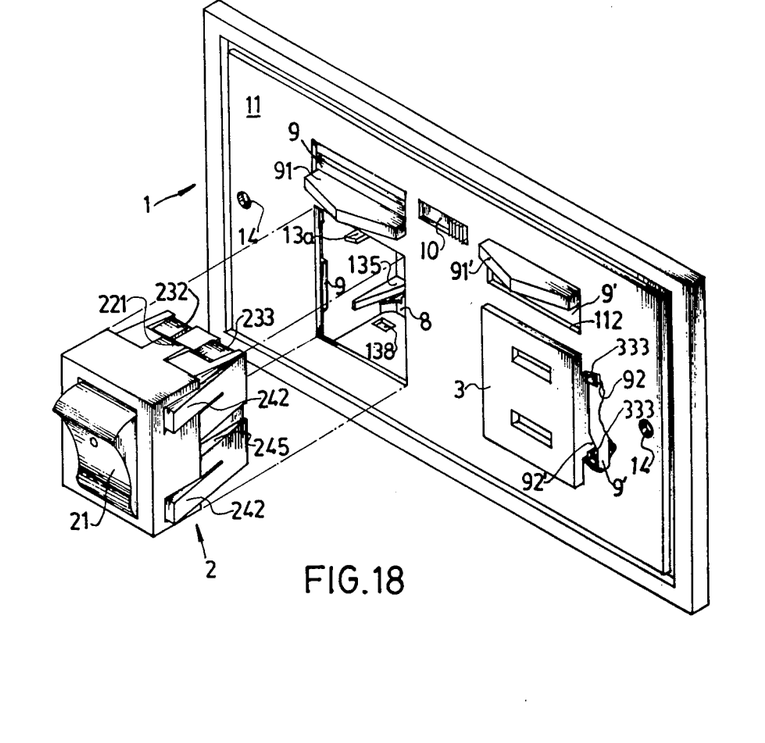
FIG. 18 is a partial exploded view of the wall switch and the wall outlet shown in FIG. 1, in which the plug-in switch unit has been taken out, and a portion of the panel beside the plug-in outlet unit has been broken away to show the salient lug of the plug-in outlet unit under the panel.

The aforesaid state exists in the plug-in outlet unit (3) as well. Referring to FIGS. 12 and 18, there is shown the salient lugs (333) of the plug-in outlet unit (3) being caught under the panel (11). Referring to FIGS. 3 and 18, the four slanting salient pieces (135) (partly shown) in both the switch niche (13') and the outlet niche (13'') also have fixing function to the plug-in unit (2) and (3) because that, upon the plug-in units (2) and (3) being inserted respectively into the niches (13') and (13''), their bases (24) and (33) will exactly be seated among the four slanting salient pieces (135).

As mentioned above that when the movable latch (10) is positioned in the centeral position under still condition, the control frames (9) and (9') are fastened by the movable latch (10), and unable to be moved. The control frame (9) and (9') can thus fasten the relevant plug-in units (2) and (3) respectively from being taken out directly. Therefore, each of said plug-in units (2) and (3) has, under static condition, two latching means for better fixing result so as to prevent it from spring out upon being touched incidentally in the dark or played by the infant.

Figure 19:
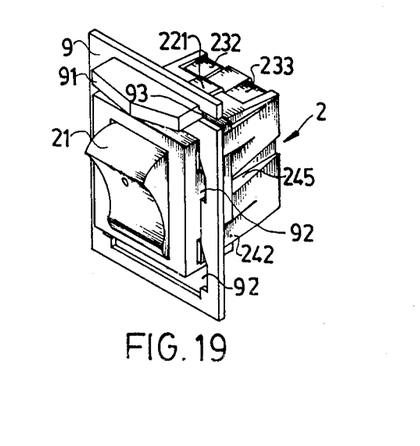
FIG. 19 is a schematic diagram for illustrating the dynamic relationship between the plug-in switch unit and the control frame.

Referring to FIG. 18, there is shown that the movable latch (10) has been moved to the outlet side; then, apply some pressure to the push key (91) so as to have the four salient lugs (242) pressed by the slanting cuts (92) into the four small channels (222) (shown in FIG. 4) of the top cover (22), as shown in FIG. 19, Now, the salient lugs (242) are not caught by the panel (11), and the plug-in switch unit (2) may be taken out with the aid of the conic spring (5) at the bottom of the niche (13'). By the same token, if the movable latch (10) is moved to the switch side, and the push key (91') is pressured downwards, the plug-in outlet unit (3) can be removed.

Figure 20:
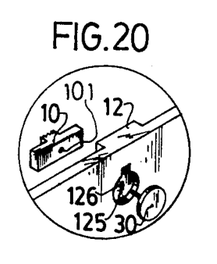
FIG. 20 is a schematic exploded diagram for illustrating the steal-proof design on the back of the base plate of the power outlet assembly shown in FIG. 14.

In case of the importance of steal-proof having more priority than the convenience of replacement and repair (for example, in a lobby, a public stair-way, and a public hall or the like), the present invention has its special steal-proof function, which is described, by referring to FIGS. 1 and 20, as follows:

Referring to FIG. 20, there is shown a schematic diagram in which a shallow hole (125) is furnished at the back of the base plate (12) and is opposite to the movable latch (10). In the center of said shallow round hole (125), there is a small thru hole (126). The shallow hole (125) is used for fitting a thumb-tack pin (30) that passes thru the small thru hole (126) and the small hole (101) on the bottom of said movable latch (10).

In case of an installing site having steal-proof requirement or absolute shock-proof requirement, the thumb-tack pin (30) will prevent the movable latch (10) from moving, thus prevent the plug-in units (2) and (3) from being removed. In case of trouble taking place, remove the screws out of the screw holes (14) on the panel (11), and remove the thumb-tack pin (30) from the slot over the shallow hole (125); then, follow the aforesaid procedures to remove the plug-in unit (2) or (3). In case of an installing site having no steal-proof and no absolute shock-proof requirements, the thumb-tack pin (30) may be removed upon installing the power outlet assembly (1).

Since the common niche (13) is adaptable to both the plug-in switch unit (2) and the plug-in outlet unit (3) during installation, a power outlet assembly (1) with one or more than one common niche (13) may, matching with said plug-in unit(s), provide one or more than one wall switch or wall outlet, or provide same number of wall switch(es) and wall outlet(s) after the first installation. When a power outlet assembly (1) contains "N" (N>1) niches being arranged abreast, "N−1" movable latches (10) may be provided, and each of them is to be installed between two control frames. When a power outlet assembly (1) includes only one niche, one movable latch (10) should be installed. In case of the "N" niches being not arranged abreast, the number of the movable latches (10) may be determined in accordance with the arrangement condition of individual case. These embodiments may be inferred by analogy, and no drawings are provided in this specification.

I claim:

1. A wall switch device comprising:
   a power outlet assembly including a panel and a base plate being fixedly attached together and a switch niche assembly installed behind said base plate to be fixedly attached to a wall box on the wall;

a plug-in switch unit insertably positioned in said switch niche assembly, said plug-in switch unit having a portion supportably interacting with said panel and base plate; and control means slidably positioned between said panel and said base plate adapted for releasably controlling said plug-in switch unit to be removed from said switch niche assembly, said plug-in switch unit includes a top cover for housing a switch button, a base having a bottom portion, said base adapted for installing a spring contact assembly, said base having a rectangular configuration and tapering off towards its bottom portion and having four salient lugs extending upward from edges of the bottom portion of said base toward a portion of said top cover at a given angle so as to acquire the inward and outward elasticity, said top cover having four channels on its two opposite outsides engaging with said four salient lugs in a dovetail manner so that said salient lugs can be completely tucked into said channels upon inserting said plug-in switch unit into said switch niche and spring out to be caught and fastened under said panel when said plug-in switch unit has been inserted therein.

2. A wall switch device as claimed in claim 1 wherein said control means comprises:

a control frame being sandwiched between said panel and said base plate and being placed between two embossed rails on said base plate;

said control frame including an aperture coincided with a first aperture of said panel, a push key extending out of a second aperture to be manually controlled for pressing said control frame to move along said embossed rails, a bow spring for restoring said control frame after said push key is released installed below said control frame, a groove, adjacent said push key, in said base plate and a slot, in said panel, beside said push key and opposite to said groove; and a movable latch being placed in said groove of said base plate and having a salient head extending out of a third aperture of said panel and being able to be manually controlled to slide along said slot and said groove for latching said control frame from being moved when an end of said latch is slid into said slot, said movable latch adapted to facilitate the removal of said plug-in switch.

3. A wall switch device as claimed in claim 2 wherein said control frame has four slanting cuts corresponding to four salient lugs of said plug-in switch unit so as to provide spaces for upper portions of salient lugs on a base of said switch unit when said plug-in switch unit has been inserted into a switch niche of said plug-in switch unit, and to press said salient lugs into channels provided on a top cover of said plug-in switch unit upon pressing said push key for removing said plug-in switch unit by the aid of the elasticity of a conic spring installed at a bottom of said switch niche.

4. A wall switch device as claimed in claim 1 wherein said switch niche assembly includes a switch niche having a rectangular configuration and having a bottom, two discrete spring contacts and a spring contact pair being mounted on two bottom corners of said switch niche, said spring contact pair including two spring contacts, which are identical to said discrete spring contacts, connected to each other along an inner surface of said switch niche, said spring contacts each having a salient foot extending out of a seam at the bottom of said switch niche and bending to a notch on the outside of said bottom, a conic spring mounted in a shallow depression which is located in the central portion of said bottom, a guide rail being embossed on an inner surface of said switch niche, and a salient piece being embossed on said inner surface opposite to said guide rail and being adjacent to one of said discrete spring contacts.

5. A wall switch device as claimed in claim 1 wherein said spring contact assembly comprises a movable spring contact having a salient foot extending out of the bottom portion of said base and appearing at one end of a fuse slot in the bottom portion of said base, a fixed leaf spring having two salient feet extending outwardly from the bottom portion of said base and then bending to a first outer surface of said base on which one of said salient feet appears at the other end of said fuse slot so as to connect electrically with said salient foot of said movable spring contact by means of a fuse element stored therein, and two fixed spring contacts each having a salient foot extending outwardly from said base and then bending to a second outer surface which is opposite to said first outer surface.

6. A wall switch device as claimed in claim 1 wherein said base is provided with a guide channel on its exterior surface for engaging with a guide rail provided inside said switch niche and a guide groove for engaging a salient piece provided inside said switch niche so as to permit said plug-in switch unit being inserted into said switch niche and to have two salient feet provided on two fixed spring contacts come into contact with two discrete spring contacts mounted at a bottom of said switch niche, and simultaneously to have to salient feet of a fixed leaf spring come into contact with a spring contact pair mounted thereon.

7. A wall switch device as claimed in claim 1 wherein said panel includes a first aperture being coincided with an aperture on said base plate so as to permit said plug-in switch unit inserting therethrough, said first aperture having a width which is narrower than that of said aperture of said base plate on which two embossed rails are embossed on both sides of said aperture, said embossed rails being in parallel with two opposite edges of said aperture and one of said embossed rails being cut into two portions by a groove, a second aperture beside said first aperture, and a third aperture which is at a position on top of a position where said groove locates thereon.

8. A wall switch device as claimed in claim 1 wherein said base plate further includes a groove for movably supporting a latch on a front surface, a shallow hole on a back surface of said base plate and a small through hole in said shallow hole to permit insertion of a thumbtack pin to pass therethrough, and through a small hole at a bottom of said movable latch for preventing said movable latch from being moved along said groove.

9. A wall outlet device comprising:

a power outlet assembly including a panel and a base plate being fixedly attached together and an outlet niche assembly installed behind said base plate to be fixedly attached to a wall box on the wall;

a plug-in outlet unit insertably positioned in said outlet niche assembly, said plug-in outlet unit having a portion supportably interacting with said panel and base plate; and control means slidably positioned between said panel and said base plate adapted for releasably controlling said plug-in outlet unit to be removed from said outlet niche assembly, said plug-in outlet unit includes a top cover having plug holes for a plug to insert therein, a base for installing a first socket contact, a second socket contact and a fixed leaf spring, said base having a rectangular configuration and having a bottom portion, said base tapering off toward its bottom portion and having four salient lugs extending upward from edges of the bottom portion of said base toward a portion of said top cover at a given angle so as to acquire the inward and outward elasticity, said top cover having four channels on its two opposite outsides engaging with said four salient lugs in a dovetail manner so that said salient lugs can be completely tucked into said channels upon inserting said plug-in outlet unit into said outlet niche assembly and spring out to be caught and fastened under said panel when said plug-in outlet unit has been inserted therein.

10. A wall outlet device as claimed in claim 9 wherein said outlet niche assembly includes an outlet niche having a rectangular configuration, two discrete spring contacts and a spring contact pair being mounted on two bottom corners of said outlet niche, said spring contact pair including two spring contacts, which are identical to said discrete spring contacts, connected to each other along an inner surface of said outlet niche, said spring contacts each having a salient foot extending out of a seam at a bottom of said outlet niche and bending to a notch on outside of said bottom, a conic spring mounting on a shallow hole which locates in a central portion of said bottom, a guide rail being embossed on an inner surface vertical to said inner surface of said outlet niche, and a salient piece being embossed on said inner surface opposite to said guide rail.

11. A wall outlet device as claimed in claim 9 wherein said first socket contact has a salient foot extending out of the bottom portion of said base and appearing at one end of a fuse slot in the bottom portion; and a fixed leaf spring having two salient feet extending outwardly from said bottom portion of said base and then bending to a second outer surface which is opposite to said first outer surface.

12. A wall outlet device as claimed in claim 9 wherein said base has a guide channel on its exterior surface for engaging with a guide rail provided inside said outlet niche and a guide groove for engaging a salient piece provided inside said outlet niche so as to permit said plug-in outlet unit being inserted into said outlet niche and to have two salient feet provided on said second socket contact come into contact with two discrete spring contacts mounted at a bottom portion of said outlet niche assembly, and simultaneously to have two salient feet of a fixed leaf spring come into contact with a spring contact pair mounted thereon.

13. A wall outlet device as claimed in claim 9 wherein said panel includes a first aperture being coincided with an aperture on said base plate so as to permit said plug-in outlet unit to be inserted therethrough, said first aperture having a width which is narrower than that of said aperture of said base plate on which two embossed rails are embossed on the both sides of said aperture, said embossed rails being in parallel with two opposite edges of said aperture and one of said embossed rails being cut into two portions by a groove, a second aperture adjacent said first aperture and a third aperture which is at a position on top of position where said groove locates thereon.

14. A wall outlet device as claimed in claim 9 wherein said base plate further includes a groove for movably supporting a latch on a front surface, a shallow hole on a back surface of said base plate and a small through hole in said shallow hole to permit a thumbtack pin mounting thereon and penetrating therethrough, and then inserting into a small hole at a bottom of said movable latch therefrom for preventing said movable latch from being moved along said groove.

* * * * *